(12) United States Patent
Uchiyama et al.

(10) Patent No.: US 10,523,696 B2
(45) Date of Patent: Dec. 31, 2019

(54) LOG ANALYZING SYSTEM AND METHOD

(71) Applicant: Hitachi, Ltd., Tokyo (JP)

(72) Inventors: Hiroki Uchiyama, Tokyo (JP); Akifumi Yato, Tokyo (JP); Satoshi Ohkubo, Tokyo (JP); Kohhei Yamaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 15/795,429

(22) Filed: Oct. 27, 2017

(65) Prior Publication Data

US 2018/0124083 A1 May 3, 2018

(30) Foreign Application Priority Data

Nov. 1, 2016 (JP) .................................. 2016-214265

(51) Int. Cl.
| | |
|---|---|
| *H04L 29/06* | (2006.01) |
| *G06F 11/30* | (2006.01) |
| *G06F 11/34* | (2006.01) |
| *H04L 12/26* | (2006.01) |

(52) U.S. Cl.
CPC ...... *H04L 63/1425* (2013.01); *G06F 11/3006* (2013.01); *G06F 11/3476* (2013.01); *H04L 43/045* (2013.01)

(58) Field of Classification Search
CPC . H04L 63/1425; H04L 41/069; H04L 43/045; H04L 43/50; H04L 63/145; H04L 63/1458; G06F 11/3006; G06F 11/3476
USPC .......................................................... 726/22
See application file for complete search history.

(56) References Cited

U.S. PATENT DOCUMENTS

| | | | | |
|---|---|---|---|---|
| 6,711,687 B1* | 3/2004 | Sekiguchi | ............. | G06F 21/552 |
| | | | | 713/186 |
| 6,813,244 B1* | 11/2004 | He | ........................ | H04L 41/046 |
| | | | | 370/235 |
| 8,085,681 B2* | 12/2011 | Raftelis | ............... | H04L 63/1441 |
| | | | | 370/235 |

(Continued)

FOREIGN PATENT DOCUMENTS

| | | | |
|---|---|---|---|
| GB | 2537457 A | 10/2016 | |
| JP | 2014-153721 A | 8/2014 | |
| WO | WO-2010067471 A1 * | 6/2010 | ............. H04L 43/50 |

OTHER PUBLICATIONS

United Kingdom Office Action received in corresponding United Kingdom Application No. GB1717787.4 dated Apr. 27, 2018.

*Primary Examiner* — Shahriar Zarrineh
(74) *Attorney, Agent, or Firm* — Mattingly & Malur, PC (57) ABSTRACT

Proposed are a log analyzing system and a log analyzing method capable of more effectively defending a control system from unauthorized access. The log analyzing system which analyzes a communication log of a control device comprises a network device which receives a communication packet corresponding to the communication log from a network, and a monitoring device which monitors communication to the network device, wherein the monitoring device obtains a difference between a communication pattern of the communication packet and a stable pattern, which is a pattern of a communication in a state of no unauthorized access, restores the communication packet based on the difference, and notifies the restored communication packet.

6 Claims, 9 Drawing Sheets

(56) References Cited

U.S. PATENT DOCUMENTS

| | | | |
|---|---|---|---|
| 8,151,341 B1* | 4/2012 | Gudov | H04L 63/1408 726/13 |
| 8,850,582 B2* | 9/2014 | Endoh | H04L 63/1416 726/22 |
| 9,516,053 B1* | 12/2016 | Muddu | G06F 16/254 |
| 10,122,740 B1* | 11/2018 | Finkelshtein | H04L 63/1441 |
| 2005/0232227 A1* | 10/2005 | Jorgenson | H04L 41/14 370/351 |
| 2006/0075492 A1* | 4/2006 | Golan | G06F 21/55 726/22 |
| 2006/0109793 A1* | 5/2006 | Kim | H04L 41/145 370/250 |
| 2006/0120284 A1* | 6/2006 | Kim | H04L 63/0227 370/230 |
| 2006/0146723 A1* | 7/2006 | Navada | H04L 43/50 370/251 |
| 2007/0171085 A1* | 7/2007 | Imai | H04L 43/0817 340/657 |
| 2008/0049619 A1* | 2/2008 | Twiss | H04L 45/04 370/236 |
| 2009/0185503 A1* | 7/2009 | Tan | H04L 12/66 370/252 |
| 2010/0103837 A1* | 4/2010 | Jungck | H04L 29/12066 370/252 |
| 2010/0138919 A1* | 6/2010 | Peng | H04L 29/12009 726/22 |
| 2010/0185414 A1* | 7/2010 | Yamamoto | B60W 50/0205 702/183 |
| 2010/0220619 A1* | 9/2010 | Chikira | H04L 43/00 370/252 |
| 2011/0023114 A1* | 1/2011 | Diab | G06F 9/4856 726/22 |
| 2012/0079042 A1* | 3/2012 | Tsurumi | G06Q 10/107 709/206 |
| 2013/0073718 A1* | 3/2013 | Kim | H04L 43/04 709/224 |
| 2013/0343207 A1* | 12/2013 | Cook | H04L 43/0852 370/252 |
| 2014/0211639 A1* | 7/2014 | Matthews | H04L 43/10 370/250 |
| 2015/0092549 A1* | 4/2015 | Anand | H04L 47/22 370/230.1 |
| 2015/0149610 A1* | 5/2015 | Jhanb | H04L 67/22 709/224 |
| 2015/0381642 A1 | 12/2015 | Kim et al. | |
| 2016/0197832 A1* | 7/2016 | Barry | H04L 45/7453 370/329 |
| 2016/0197952 A1* | 7/2016 | Fujimoto | H04L 63/1416 |
| 2016/0255104 A1* | 9/2016 | Eslambolchi | H04L 63/1416 726/23 |
| 2016/0277547 A1* | 9/2016 | Kim | H04L 43/028 |
| 2016/0330086 A1* | 11/2016 | Oda | H04L 41/0631 |

* cited by examiner

LOG ANALYZING SYSTEM AND METHOD

TECHNICAL FIELD

The present invention generally relates to a log analyzing system and a log analyzing method, and particularly relates to a log analyzing system which analyzes the communication logs of a control system of plant facilities, and extracts communication logs based on unauthorized access.

BACKGROUND ART

Without limitation to plant facilities, a control system utilizing computers is being widely used in various fields such as automobiles and household appliances. Furthermore, pursuant to the advancement of IT, control systems are now able to input/output information via a network. Meanwhile, in line with this, unauthorized access to control systems through malwares and DoS attacks are increasing. Thus, various technologies are being proposed for protecting control systems from unauthorized access.

It is difficult to check, one by one, the huge amounts of communication logs sent to the control system, and detect unauthorized access. Thus, PTL 1 discloses a technology of preparing a plurality of templates to process the communication logs, and reducing the amount of communication logs to be confirmed for preventing unauthorized access based on with which template the communication log had matched.

CITATION LIST

Patent Literature

[PTL 1] Japanese Patent Application Publication No. 2014-153721

SUMMARY OF THE INVENTION

Problems to be Solved by the Invention

Nevertheless, with the invention described in PTL 1, because the pattern of communication logs of the control system would change considerably depending on the operation mode of the control system, there were limitations to begin with in defending the control system from unauthorized access using templates. Here, the term "pattern" refers to, for instance, the characteristic of communication logs when focusing on the frequency. Moreover, a pattern of communication is hereinafter referred to as a "communication pattern".

The present invention proposes a log analyzing system and a log analyzing method capable of more effectively defending a control system from unauthorized access.

Means to Solve the Problems

In order to solve the foregoing problems, the present invention provides a log analyzing system which analyzes a communication log of a control device, the log analyzing system comprising: a network device which receives a communication packet corresponding to the communication log from a network; and a monitoring device which monitors communication to the network device, wherein the monitoring device obtains a difference between a communication pattern of the communication packet and a stable pattern, which is a pattern of a communication in a state of no unauthorized access, restores the communication packet based on the difference, and notifies the restored communication packet.

The present invention additionally provides a log analyzing method in a log analyzing system which analyzes a communication log of a control device, wherein the log analyzing system comprises: a network device which receives a communication packet corresponding to the communication log from a network; and a monitoring device which monitors communication to the network device, and wherein the log analyzing method comprises: a first step of the monitoring device obtaining a difference between a communication pattern of the communication packet and a stable pattern, which is a pattern of a communication in a state of no unauthorized access; a second step of the monitoring device restoring the communication packet based on the difference; and a third step of the monitoring device notifying the restored communication packet.

Advantageous Effects of the Invention

According to the present invention, it is possible to realize a log analyzing system and a log analyzing method capable of more effectively defending a control system from unauthorized access.

DESCRIPTION OF EMBODIMENTS

An embodiment of the present invention is now explained in detail with reference to the appended drawings. Note that the present invention is not limited by the ensuing embodiments.

Figure 1:
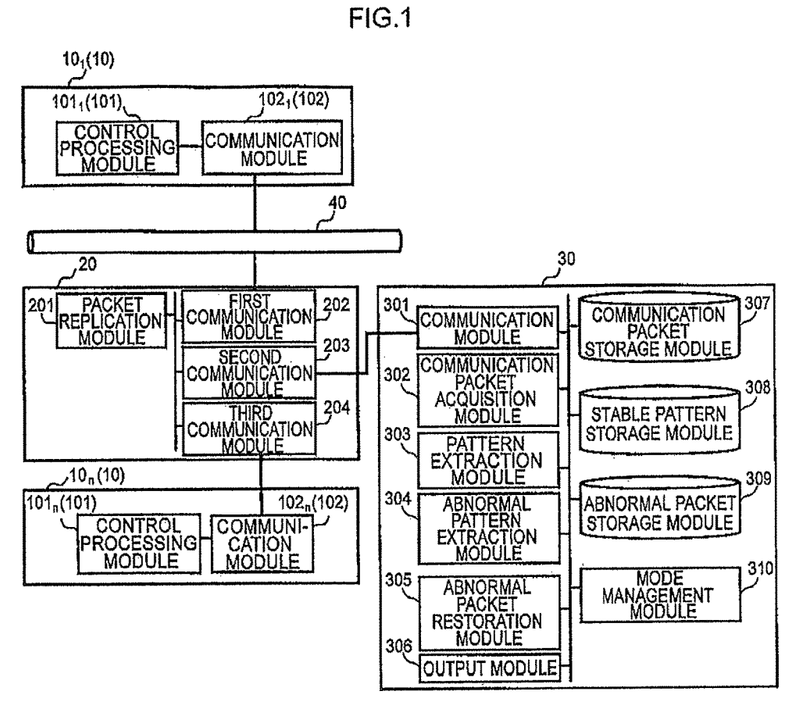
FIG. 1 is a block diagram showing a functional configuration of the log analyzing system according to the first embodiment.

(1) First Embodiment (1-1) Configuration of Log Analyzing System According to this Embodiment FIG. 1 shows a functional configuration of the log analyzing system according to this embodiment. This system comprises a network device 20, a monitoring device 30 which monitors the communication logs of a control device 10, and a network 40 such as an intranet.

The control device 10 is an element which controls an object to be controlled such as a plant facility, and is not limited to a single device, and there are a plurality of control devices 10 as represented with $10_1$ to $10_n$ illustrated in FIG. 1. The control device 10 is specifically a computer, a controller (MPU) or the like. The term "computer" includes a server computer and a client computer. The control device 10 comprises control processing modules 101 ($101_1$ to $101_n$) which perform predetermined control processing, and communication modules 102 ($102_1$ to $102_n$) which communicate with the network 40 and the network device 20.

The network device 20 is a device such as a router or a layer 2 switch which performs network control of the log analyzing system, and comprises a packet replication module 201, a first communication module 202, a second communication module 203 which communicates with the monitoring device 30, and a third communication module 204. The term "module" is a unit which realizes a control function, and is realized by a program and/or hardware.

The packet replication module 201 replicates a communication packet 1200 (refer to FIG. 12) which is input to the network device 20, the first communication module 202 communicates with the network 40, the second communication module communicates with the monitoring device 30, and the third communication module 204 communicates with the control device $10_n$. Note that the network device 20 may also comprise four or more communication modules, and, for instance, in such a case the fourth communication module communicates with the control device $10_2$ not shown.

The monitoring device 30 is a device which monitors the communication logs of a control system in plant facilities or the like, and comprises a communication module 301, a communication packet acquisition module 302, a pattern extraction module 303, an abnormal pattern extraction module 304, an abnormal packet restoration module 305, an output module 306, a communication packet storage module 307, a stable pattern storage module 308, an abnormal packet storage module 309 and a mode management module 310.

The communication module 301 communicates with the network device 20, the communication packet acquisition module 302 acquires the communication packet 1200 which is input to the monitoring device 30, and the pattern extraction module 303 extracts a pattern of the communication packet 1200 acquired by the communication packet acquisition module 302.

The abnormal pattern extraction module 304 extracts an abnormal pattern included in the communication packet 1200 acquired by the communication packet acquisition module 302, and the abnormal packet restoration module 305 restores the communication packet 1200 corresponding to the abnormal pattern extracted by the abnormal pattern extraction module 304.

The term "pattern" refers to a manner of communication based on a combination of a plurality of communication logs, and, for instance, is identified by subjecting a plurality of communication logs to Fourier transform. The term "abnormal pattern" refers to a pattern based on a plurality of communication logs associated with unauthorized access through malwares and DoS attacks. An abnormal pattern can be extracted by being compared with a pattern in an environment where it is possible to assume that there is no unauthorized access to the control system.

The foregoing environment is, for instance, an operational status such as a trial condition of the control system in which the operation of the control system is calmer than a normal operational status. This operational status is hereinafter referred to as the "stable operational status". When the control device is in a normal operational status (or operating condition), there is a possibility of various types of unauthorized access because the control device is active, but when the control device is in a stable operational status (or trial condition), it can be assumed that there is hardly any risk of unauthorized access, or the risk of unauthorized access is small, in comparison to the normal operational status.

A communication pattern in the foregoing state is hereinafter referred to as a "stable pattern" in association with the stable operational status. The monitoring module can extract an abnormal pattern among the communication patterns by comparing the communication patterns with the stable pattern.

A state where it is possible to assume that there is no unauthorized access to the control system is, for instance, a state where minimum required control commands have been input to the control device 10 (this state is hereinafter referred to as "during the trial run of the control system").

The communication packet storage module 307 stores the communication packet 1200 acquired by the communication packet acquisition module 302, and the stable pattern storage module 308 stores the stable communication pattern 1300 (refer to FIG. 13) extracted by the pattern extraction module 303.

The abnormal packet storage module 309 stores the abnormal packet restored by the abnormal packet restoration module 305, and the mode management module 310 manages the operation mode of the monitoring device 30. There are two types of operation modes; specifically, a default mode and an active mode. The default mode is an operation mode of the monitoring device 30 for acquiring a stable pattern, and the active mode is an operation mode of the monitoring device 30 for acquiring an abnormal pattern.

When the operation mode of the monitoring device 30 is set to the default mode by the mode management module 310, the monitoring device 30 and the log analyzing system become a trial condition, and when the operation mode of the monitoring device 30 is set to the active mode by the mode management module 310, the monitoring device 30 and the log analyzing system become an operating condition.

For example, the operation mode of the monitoring device 30 is set to the default mode by the mode management module 310 when specific minimum required control commands are input to the control device 10. Moreover, for example, the operation mode of the monitoring device 30 is set to the active mode by the mode management module 310 in cases other than the default mode.

Note that the method of setting the operation mode of the monitoring device 30 is not limited to the foregoing method and, for example, the default mode may be set upon activating the monitoring device 30, or the default mode may be set upon the monitoring device 30 receiving an external electrical signal from a switch or the like.

Moreover, it is also possible to prevent the operation mode of the monitoring device 30 from being set to the default mode during the abnormal packet extraction processing SP35 (refer to FIG. 9) or the like, and it is also possible to prevent the operation mode of the monitoring device 30 from being set to the active mode during the pattern extraction processing SP25 (refer to FIG. 7) or the like.

Figure 2:
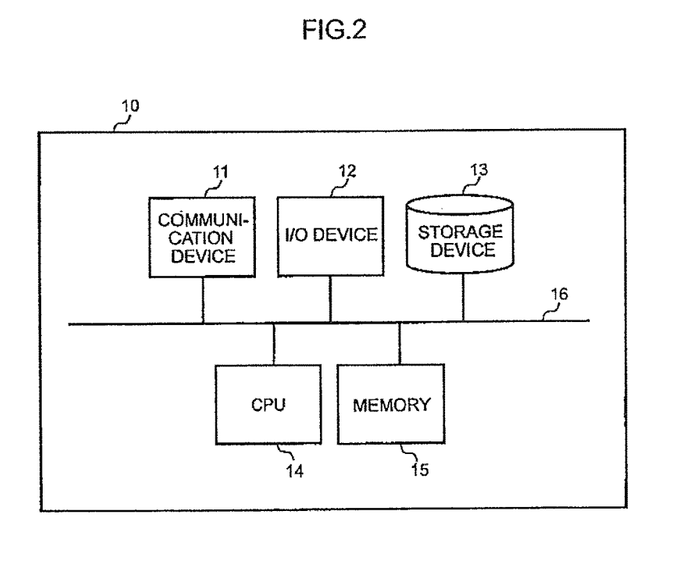
FIG. 2 is a block diagram showing a hardware configuration of the control device according to this embodiment.

FIG. 2 shows a hardware configuration of the control device 10. The control device 10 comprises a communication device 11, an I/O device 12, a storage device 13, a CPU 14 and a memory 15, and the respective devices are connected via an internal communication line 16 such as a bus.

The communication device 11 is a network card or the like, and comprises a communication module 102. The I/O device 12 is a keyboard, a mouse and a display or the like, and the user creates control commands by using the I/O device 12. Moreover, the I/O device 12 may also be an LED and a push button or the like.

The memory 15 comprises a control processing module 101, and the CPU 14 calls the control processing module 101 to perform control processing. Upon performing control processing and upon creating control commands, various types of tables related to control commands stored in the storage device 13 are used.

Figure 3:
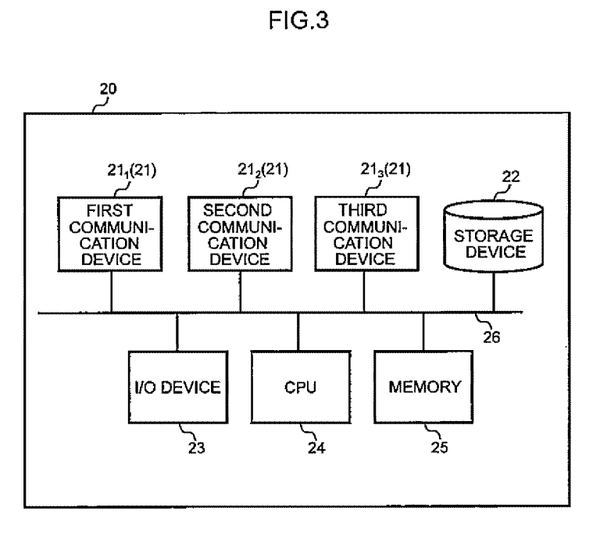
FIG. 3 is a block diagram showing a hardware configuration of the network device according to this embodiment.

FIG. 3 shows a hardware configuration of the network device 20. The network device 20 comprises a communication device 21 such as a network card, a storage device 22, an I/O device 23, a CPU 24 and a memory 25, and the respective devices are connected via an internal communication line 26 such as a bus.

The communication device 21 is a first communication device $21_1$, a second communication device $21_2$, a third communication device $21_3$ or the like, and the first communication device $21_1$ comprises a first communication module 202, the second communication device $21_2$ comprises a second communication module 203, and the third communication device $21_3$ comprises a third communication module 204. Note that the communication device 21 is not limited to three devices, and the network device 20 may also comprise four or more communication devices 21.

For example, the control device $10_1$ may be connected to the first communication device $21_1$ via the network 40, the monitoring device 30 may be connected to the second communication device $21_2$, and the control device $10_n$ may be connected to the third communication device $21_3$.

The memory 25 comprises a packet replication module 201, and the CPU 24 calls the packet replication module 201 to perform packet replication processing for replicating the communication packet 1200. The storage device 22 stores tables and the like that are used for the packet replication processing.

The I/O device 23 is a keyboard, a mouse and a display or the like, and the user may use the I/O device 23 to add additional information to the communication packet 1200 to be replicated or change the information of the transmission destination. Moreover, the I/O device 23 may also be an LED and a push button or the like.

Figure 4:
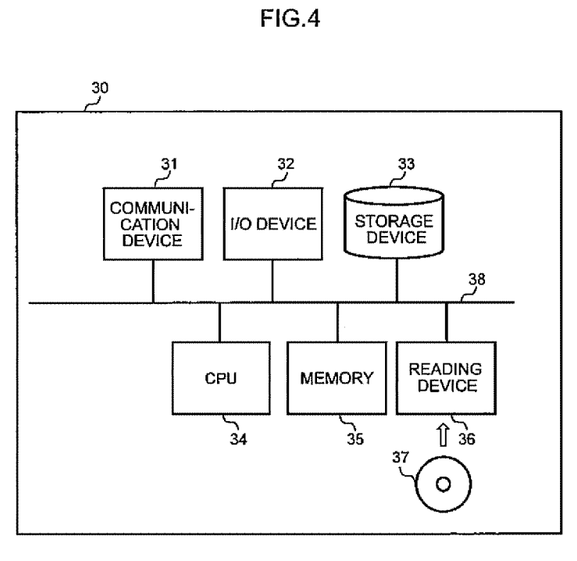
FIG. 4 is a block diagram showing a hardware configuration of the monitoring device according to this embodiment.

FIG. 4 shows a hardware configuration of the monitoring device 30. The monitoring device 30 comprises a communication device 31, an I/O device 32, a storage device 33, a CPU 34, a memory 35 and a reading device 36 which reads a storage medium 37, and the respective device are connected via an internal communication line 38 such as a bus.

The communication device 31 is a network card or the like, and comprises a communication module 301. The I/O device 32 is a keyboard, a mouse and a display or the like, and the user monitors the log analyzing system by using the I/O device 32 and designating the conditions with a mouse and a keyboard, and displaying, on the display, the monitoring result output by the output module 306. Moreover, the I/O device 32 may also be an LED and a push button or the like.

The memory 35 comprises a communication packet acquisition module 302, a pattern extraction module 303, an abnormal pattern extraction module 304, an abnormal packet restoration module 305, an output module 306 and a mode management module 310. The storage device 33 comprises a communication packet storage module 307, a stable pattern storage module 308 and an abnormal packet storage module 309. The CPU 34 calls the respective modules stored in the memory 35 and performs monitoring processing. The respective modules stored in the storage device 33 are used upon performing monitoring processing.

(1-2) Log Analyzing Function

The log analyzing function of the log analyzing system according to this embodiment is now explained. The log analyzing function is realized, for example, by a program stored in the storage device 33 of the monitoring device 30 being loaded into the memory 35, and executed by the CPU 34.

Moreover, the respective programs may be stored in the storage device 33 in advance, or loaded as needed via another storage medium or communication medium (network or carrier waves that propagate through a network).

Figure 5:
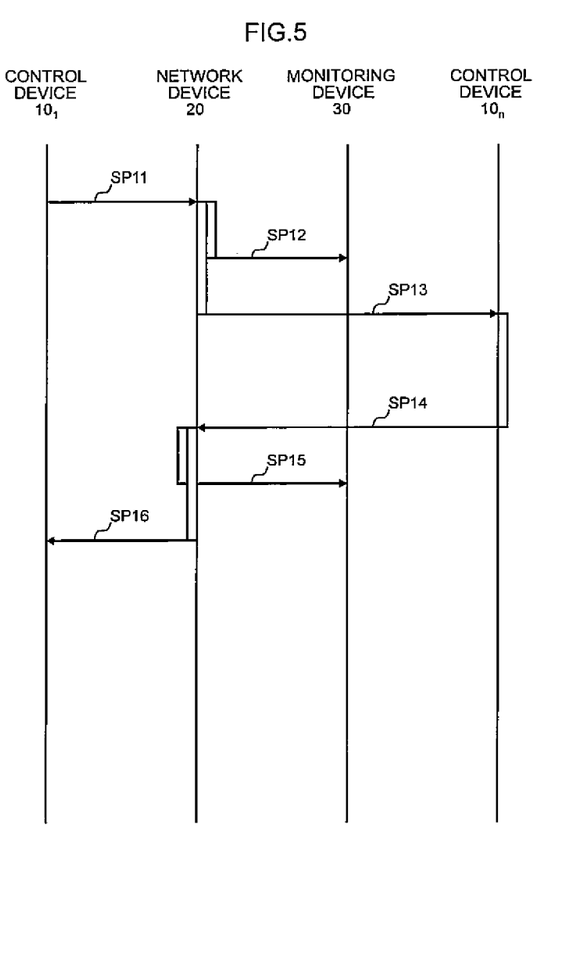
FIG. 5 is a sequence diagram showing the flow of execution processing that is performed during the trial run of the log analyzing system according to the first embodiment.

FIG. 5 is a sequence diagram showing the flow of execution processing that is performed during the trial run of the log analyzing system according to the first embodiment.

The mode management module 310 of the monitoring device 30 sets the operation mode of the monitoring device 30 to the default mode. Here, when the operation mode cannot be set to the default mode or the subsequent processing will be executed without the operation mode being set to the default mode, the subsequent processing may be cancelled.

The control device $10_1$ creates a control command with the control processing module $101_1$, and sends the control command to the network device 20 via the communication module $102_1$ (SP11). The packet replication module 201 of the network device 20 acquires the control command from the control device $10_1$ via the first communication module 202, and replicates the control command as the communication packet 1200.

The second communication module 203 sends, to the monitoring device 30, the control command that was replicated by the packet replication module 201 (SP12). The third communication module 204 sends, to the control device $10_n$, the control command that was replicated by the packet replication module 201 (SP13).

When the communication packet acquisition module 302 of the monitoring device 30 acquires the control command via the communication module 301, the communication packet acquisition module 302 acquires the reception time and the reception size, and stores the communication packet 1200 in the communication packet storage module 307.

When the control processing module 101$_n$ of the control device 10$_n$ acquires the control command via the communication module 102$_n$, the control processing module 101$_n$ performs processing based on the control command, and returns a reply to the control command to the network device 20 via the communication module 102$_n$ (SP14).

When the packet replication module 201 of the network device 20 acquires, via the third communication module 204, the reply to the control command sent from the control device 10$_n$, the packet replication module 201 replicates the reply to the control command.

The replicated reply to the control command is sent to the monitoring device 30 via the second communication module 203 (SP15). Moreover, the replicated reply to the control command is sent to the control device 10$_1$ via the first communication module 202 (SP16).

When the communication packet acquisition module 302 of the monitoring device 30 acquires the reply to the control command via the communication module 301, the communication packet acquisition module 302 acquires the reception time and the reception size, and stores the communication packet 1200 in the communication packet storage module 307.

The communication packet acquisition module 302 of the monitoring device 30 determines whether the trial run has ended, for instance, as a result of the monitoring device 30 receiving an external electrical signal from a switch or the like, instructions being given based on control commands through communication, or, when the number of communication packets to be transmitted/received is predetermined, such number of communication packets being transmitted/received.

Figure 6:
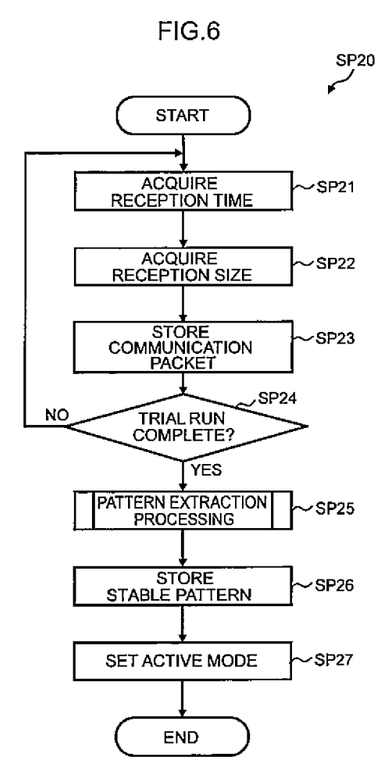
FIG. 6 is a flowchart showing a processing routine of the pattern storage processing.

FIG. 6 is a flowchart showing a processing routine of the pattern storage processing performed in the monitoring device 30. When the communication packet acquisition module 302 acquires a control command or a reply to the control command via the communication module 301, the communication packet acquisition module 302 acquires the reception time and the reception size (SP21 and SP22), and stores the communication packet 1200 in the communication packet storage module 307 (SP23).

After storing the communication packet 1200 in the communication packet storage module 307, the communication packet acquisition module 302 determines whether the trial run has ended (SP24). The communication packet acquisition module 302 returns to step SP21 upon obtaining a negative result in the foregoing determination, and repeats the processing of step SP21 to step SP23 until a positive result is obtained in step SP24. Based on this repetitive processing, the monitoring device 30 acquires the communication packet 1200 during the trial run of the log analyzing system.

Figure 7:
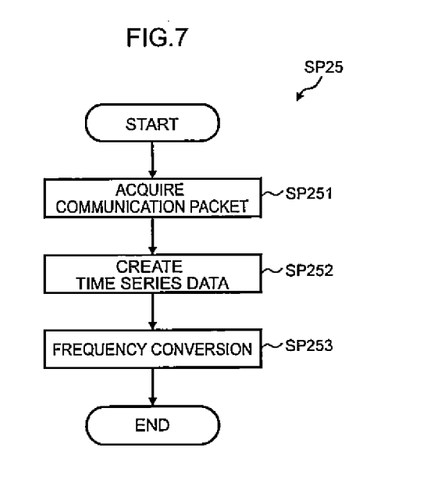
FIG. 7 is a flowchart showing a processing routine of the pattern extraction processing.

When the communication packet acquisition module 302 obtains a positive result in step SP24 as a result of the trial run being ended, the pattern extraction module 303 performs the pattern extraction processing of extracting the stable pattern shown in FIG. 7 (SP25).

The pattern extraction module 303 acquires the communication packet 1200 from the communication packet storage module 307 (SP251). The communication packet 1200 acquired by the pattern extraction module 303 in the foregoing case may be all communication packets 1200 stored in the communication packet storage module 307, or the communication packet 1200 corresponding to a predetermined data volume.

The pattern extraction module 303 generates data along a time series indicating the transmission/reception time and size of the acquired communication packet 1200 (SP252). Note that the information to be indicated together with the transmission/reception time is not limited to the transmission/reception size, and may also be the number of transmissions/receptions of the communication packet 1200 at such point in time or the amount of communication packets 1200 corresponding to a specific data size.

The pattern extraction module 303 subjects the generated time series data to frequency conversion, and generates information of the frequency and its strength (influence) distribution (SP253). Note that, for the frequency conversion, methods such as FFT (fast Fourier transform) may be used.

The pattern extraction module 303 stores, in the stable pattern storage module 308, the frequency and its strength (influence) included in the frequency-converted data as a stable pattern (SP26). The mode management module 310 sets the operation mode of the monitoring device 30 to the active mode (SP27), and the monitoring device 30 ends the communication pattern storage processing. Note that, upon setting the operation mode, the communication packet 1200 stored in the communication packet storage module 307 may be deleted.

Because the flow of execution processing during the operation of the log analyzing system according to the first embodiment is basically the same as the sequence diagram shown in FIG. 5, only the differences will be explained.

During operation, the mode management module 310 does not change the setting. Moreover, the monitoring device 30 performs the abnormal packet storage processing shown in FIG. 8 in substitute for the pattern storage processing. When the communication packet acquisition module 302 acquires a control command or a reply to the control command via the communication module 301, the communication packet acquisition module 302 acquires the reception time and the reception size (SP31 and SP32), and stores the communication packet 1200 in the communication packet storage module 307 (SP33).

Figure 8:
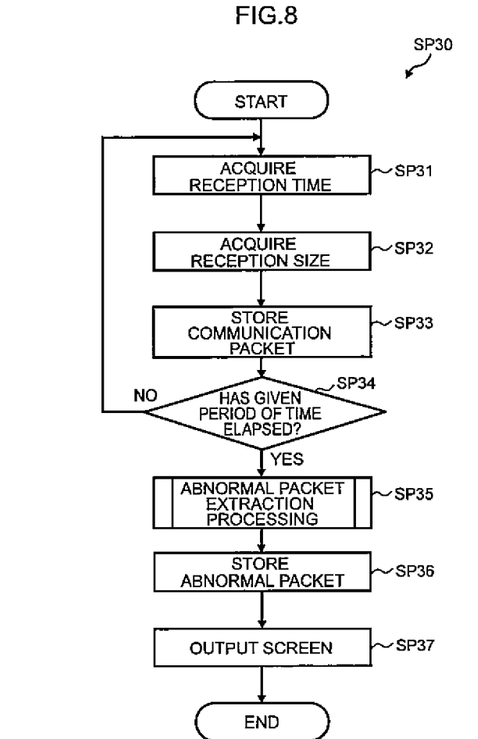
FIG. 8 is a flowchart showing a processing routine of the abnormal packet storage processing.

After storing the communication packet 1200 in the communication packet storage module 307, the communication packet acquisition module 302 determines whether a given period of time has elapsed from the setting of the operating condition (SP34). Note that the condition of determination in step SP34 is not limited to the lapse of a given period of time, and, for instance, the condition of determination may also be whether the monitoring device 30 received an external electrical signal from a switch or the like, whether instructions were given based on control commands through communication, or, when the number of communication packets to be transmitted/received is predetermined, whether such number of communication packets were transmitted/received.

The communication packet acquisition module 302 returns to step SP31 upon obtaining a negative result in the foregoing determination, and repeats the processing of step SP31 to step SP3 until a positive result is obtained in step SP34. Based on this repetitive processing, the monitoring device 30 acquires the communication packet 1200 during the operation of the log analyzing system.

Figure 9:
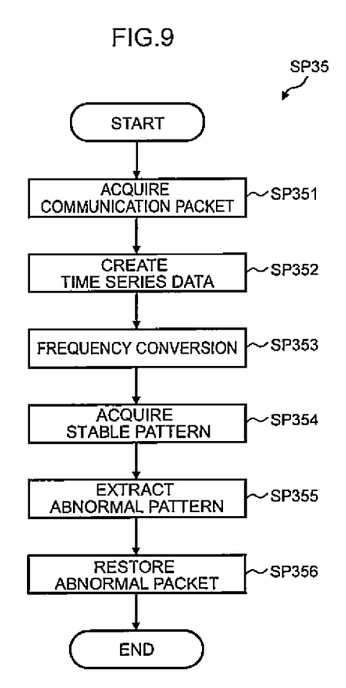
FIG. 9 is a flowchart showing a processing routine of the abnormal packet extraction processing.

When the communication packet acquisition module 302 obtains a positive result in step SP34 as a result of a given period of time having elapsed, the abnormal pattern extraction module 304 performs the abnormal packet extraction processing of extracting the abnormal packet shown in FIG. 9 (SP35).

The abnormal pattern extraction module 304 acquires the communication packet 1200 from the communication packet storage module 307 (SP351). The communication packet 1200 acquired by the pattern extraction module 303 in the foregoing case may be all communication packets 1200 stored in the communication packet storage module 307, or the communication packet 1200 corresponding to a predetermined data volume.

The abnormal pattern extraction module 304 generates data along a time series indicating the transmission/reception time and size of the acquired communication packet 1200 (SP352). Note that the information to be indicated together with the transmission/reception time is not limited to the transmission/reception size, and may also be the number of transmissions/receptions of the communication packet 1200 at such point in time or the amount of communication packets 1200 corresponding to a specific data size.

The abnormal pattern extraction module 304 subjects the generated time series data to frequency conversion, and generates information of the frequency and its strength (influence) distribution (SP353). Note that, for the frequency conversion, methods such as FFT (fast Fourier transform) may be used.

The abnormal pattern extraction module 304 acquires the stable pattern stored in the stable pattern storage module 308 (SP354). The abnormal pattern extraction module 304 extracts an abnormal pattern by comparing the frequency-converted time series data and the acquired stable pattern and extracting the difference thereof (SP355).

The abnormal packet restoration module 305 restores the abnormal packet based on the abnormal pattern extracted by the abnormal pattern extraction module 304 (SP356). In effect, the abnormal packet restoration module 305 acquires information of time and size by subjecting the abnormal pattern to inverse frequency conversion such as inverse FFT (inverse fast Fourier transform).

The abnormal packet restoration module 305 restores the abnormal packet by using the acquired information of time and size and the communication packet 1200 acquired by the abnormal pattern extraction module 304 from the communication packet storage module 307.

The abnormal packet restoration module 305 stores the restored abnormal packet in the abnormal packet storage module (SP36). The output module 306 outputs the abnormal packet restored by the abnormal packet restoration module 305 to a screen of a display or the like (SP37), and the monitoring device 30 ends the abnormal packet storage processing.

Figure 10:
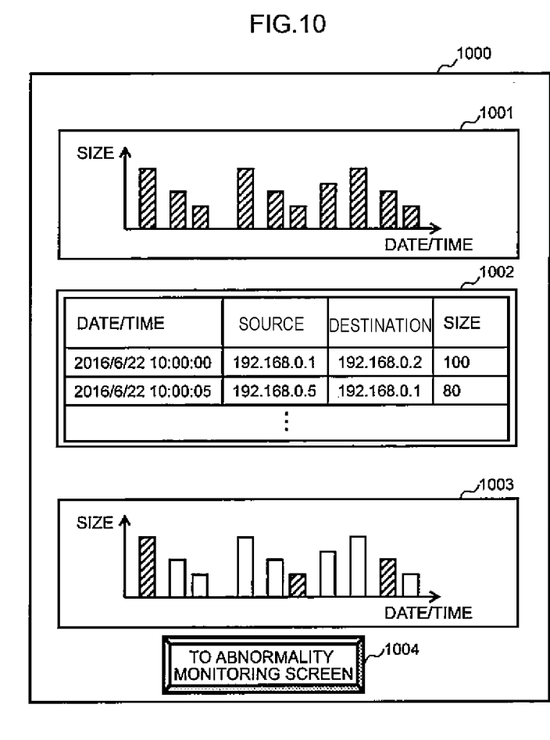
FIG. 10 is a schematic diagram schematically showing a configuration of the monitoring screen.

FIG. 10 is a schematic diagram schematically showing a configuration of the monitoring screen 1000. The monitoring screen 1000 is a screen which is output by the output module 306, and comprises a communication status 1001, communication data details 1002, an abnormal communication extraction result 1003 and a transition button 1004.

While the communication status 1001 is a graph in which horizontal axis is the date/time of the communication packet 1200 and the vertical axis is the size information, the communication status 1001 is not limited thereto. The communication data details 1002 comprise date/time information, source/destination information, and size information of the communication packet 1200, but the communication data details 1002 are not limited thereto.

The abnormal communication extraction result 1003 includes the date/time information and size information of packets assumed to be abnormal packets among the communication packets 1200, but the abnormal communication extraction result 1003 is not limited thereto. As a result of the user pressing the transition button 1004, the screen display is changed to the abnormal monitoring screen 1100 shown in FIG. 11.

Note that the constituent elements of the monitoring screen 1000 are not limited those described above, and it will suffice so as long as the foregoing elements are at least included. Moreover, the order of the constituent elements of the monitoring screen 1000 is not limited to the order described above.

Figure 11:
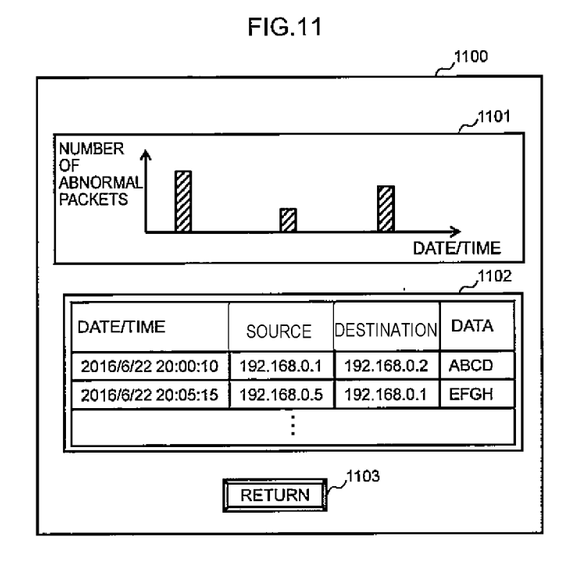
FIG. 11 is a schematic diagram schematically showing a configuration of the abnormal monitoring screen.

The abnormal monitoring screen 1100 is a screen which is output by the output module 306, and comprises an abnormal packet overview 1101, abnormal packet details 1102 and a transition button 1103. While the abnormal packet overview 1101 is a graph in which the horizontal axis is the date/time information and the vertical axis is the number of abnormal packets per unit time, the abnormal packet overview 1101 is not limited thereto, and, for instance, the vertical axis may be the size information.

The abnormal packet details 1102 include the date/time information and the source/destination information of abnormal packets, and the data information which was actually transmitted/received, but the abnormal packet details 1102 are not limited thereto. Note that the constituent elements of the abnormal monitoring screen 1100 are not limited those described above, and it will suffice so as long as the foregoing elements are at least included. Moreover, the order of the constituent elements of the abnormal monitoring screen 1100 is not limited to the order described above.

Note that, in the foregoing explanation, while the monitoring screen 1000 and the abnormal monitoring screen 1100 were described as separate screen displays, the abnormal packet overview 1101 and the abnormal packet details 1102 may be displayed in substitute for the transition button 1004 of the monitoring screen 1000.

Figure 12:
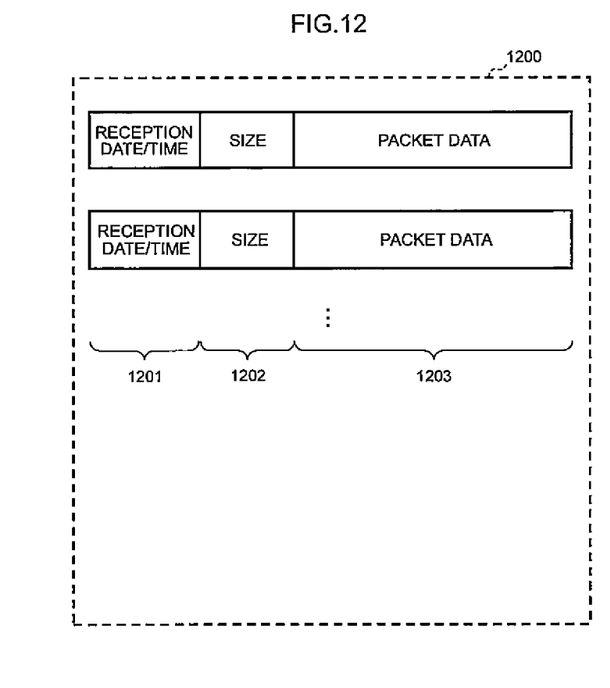
FIG. 12 is a conceptual diagram showing a configuration of the communication packet.

FIG. 12 is a conceptual diagram showing a configuration of the communication packet 1200. A plurality of communication packets 1200 are stored in the communication packet storage module 307, and each communication packet 120 comprises reception date/time 1201 that the packet was received, packet size 1202, and packet data 1203 as the binary data of the packet.

The constituent elements of the communication packet 1200 are not limited those described above, and it will suffice so as long as the foregoing elements are at least included. Moreover, the order of the constituent elements of the communication packet 1200 is not limited to the order described above.

Figure 13:
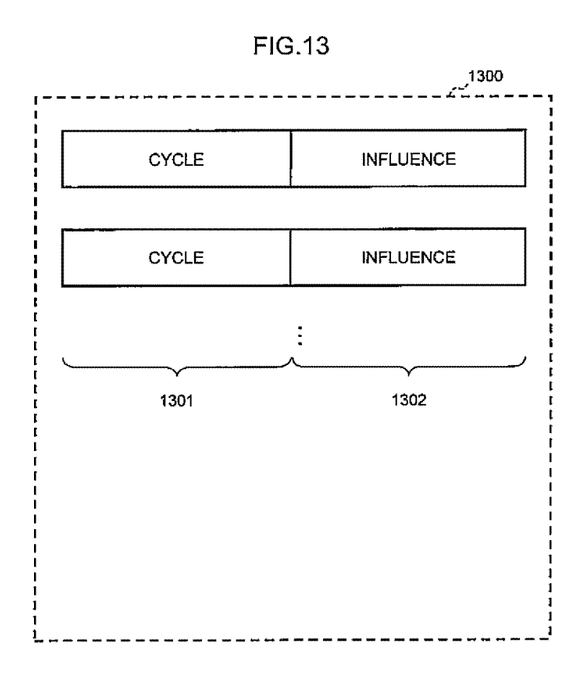
FIG. 13 is a conceptual diagram showing a configuration of the communication pattern.

FIG. 13 is a conceptual diagram showing a configuration of the communication pattern 1300. The communication pattern 1300 is the stable pattern stored in the stable pattern storage module 308 of the monitoring device 30, or the abnormal pattern extracted by the abnormal pattern extraction module 304.

The communication pattern 1300 is configured from a cycle 1301 in which communication is generated, and influence 1302 as the strength indicating the ratio occupied by the data configuring the cycle 1301. Here, the constituent elements of the communication pattern 1300 are not limited to those described above, and it will suffice so as long as the foregoing elements are at least included. Moreover, the order of the constituent elements of the communication pattern 1300 is not limited to the order described above.

Figure 14:
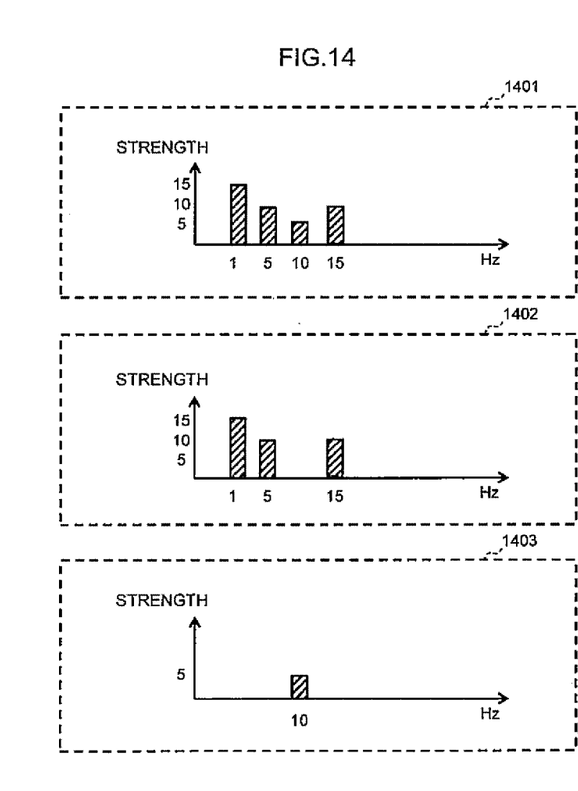
FIG. 14 is a conceptual diagram showing a distribution of the frequency and strength of the communication pattern.

FIG. 14 is a conceptual diagram showing a distribution of the frequency and strength of the communication pattern 1300. The distribution graph 1401 is a graph indicating the communication pattern 1300 in which the vertical axis is the strength, and the horizontal axis is the frequency (Hz). The distribution graph 1402 graphically shows the stable pattern, and the distribution graph 1403 graphically shows the abnormal pattern.

Here, assuming that 1 Hz (influence is 15), 5 Hz (influence is 10), 10 Hz (influence is 5) and 15 Hz (influence is 10) were acquired as the communication patterns 1300, and assuming that the stable pattern is 1 Hz (influence is 15), 5 Hz (influence is 10) and 15 Hz (influence is 10), 10 Hz (influence is 5) is extracted as the abnormal pattern.

(1-3) Effect of this Embodiment

As described above, with the log analyzing system of this embodiment, information required for detecting and dealing with abnormalities can be effectively extracted by outputting log data from which are excluded logs related to stable operation patterns collected during the trial run of the control system in the monitoring device.

Accordingly, with this log analyzing system, it is possible to realize a log analyzing system and a log analyzing method capable of more effectively defending a control system from unauthorized access.

(2) Second Embodiment

Figure 15:
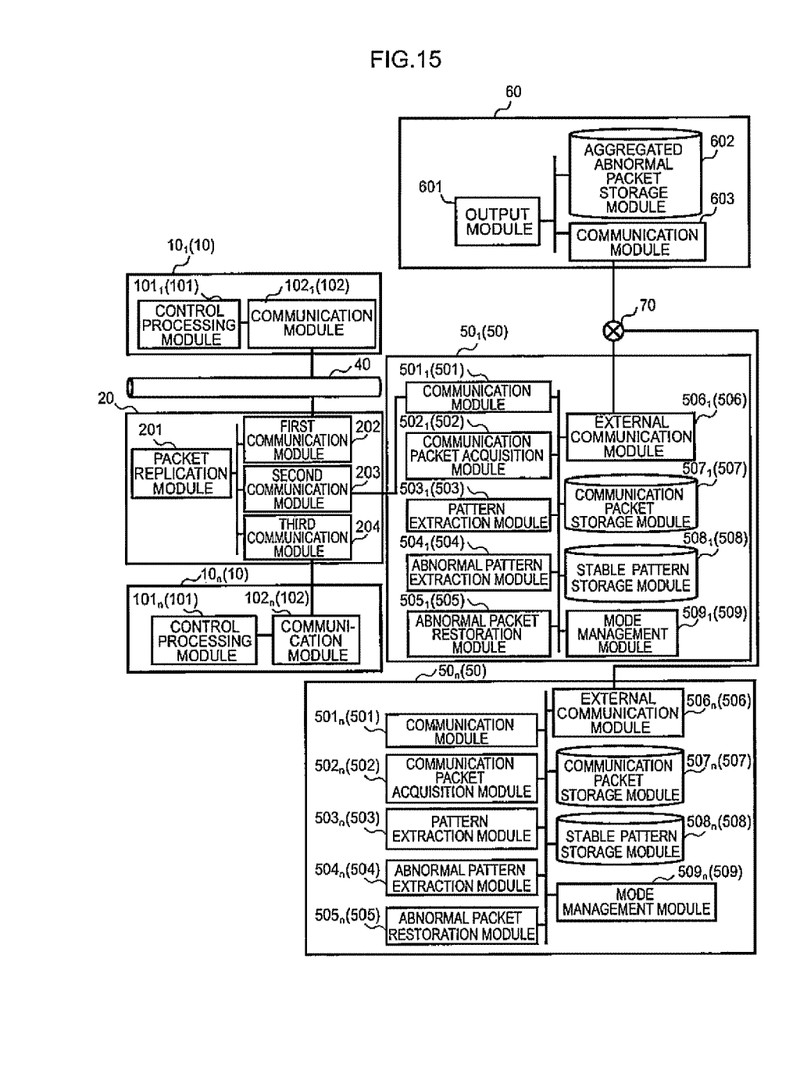
FIG. 15 is a block diagram showing a functional configuration of the log analyzing system according to the second embodiment.

While the first embodiment explained a log analyzing system connected only to a highly secure network 40 such as an intranet, log analysis may also be performed via a network outside the control system; for instance, through an external network 70 such as the internet shown in FIG. 15. Differences in comparison to the first embodiment are now explained.

Because the control device 10, the network device 20 and the network 40 are the same as the first embodiment, the explanation thereof is omitted. In this embodiment, devices corresponding to the monitoring device 30 is a collection device 50 and a monitoring center 60. Because the hardware configuration of the collection device 50 and the monitoring center 60 is the same as the hardware configuration of the monitoring device 30, the explanation thereof is omitted.

The collection device 50 is provided in a plurality as collection devices $50_1$ to $50_n$, is a device such as a layer 2 switch or a server which collects the communication packets 1200, and comprises a communication module 501, a communication packet acquisition module 502, a pattern extraction module 503, an abnormal pattern extraction module 504, an abnormal packet restoration module 505, an external communication module 506, a communication packet storage module 507, a stable pattern storage module 508 and a mode management module 509.

Because the communication module 501, the communication packet acquisition module 502, the pattern extraction module 503, the abnormal pattern extraction module 504 and the abnormal packet restoration module 505 are equivalent to the communication module 301, the communication packet acquisition module 302, the pattern extraction module 303, the abnormal pattern extraction module 304 and the abnormal packet restoration module 305, the explanation thereof is omitted.

Because the communication packet storage module 507, the stable pattern storage module 508 and the mode management module 509 are equivalent to the communication packet storage module 307, the stable pattern storage module 308 and the mode management module 310, the explanation thereof is omitted. The external communication module 506 communicates with the external communication module 506 of other collective devices 50 and the monitoring center via the external network 70.

Note that each collection device 50 comprises each of the following modules; specifically, a communication module $501_n$, a communication packet acquisition module $502_n$, a pattern extraction module $503_n$, an abnormal pattern extraction module $504_n$, an abnormal packet restoration module $505_n$, an external communication module $506_n$, a communication packet storage module $507_n$, a stable pattern storage module $508_n$ and a mode management module $509_n$. The communication module $501_n$ communicates, for instance, with the fourth communication module of the network device 20.

The monitoring center 60 comprises an output module 601, an aggregated abnormal packet storage module 602 and a communication module 603. The communication module 603 acquires an abnormal packet from the collection device 50 via the external network 70. The aggregated abnormal packet storage module 602 stores the abnormal packets acquired from the respective collection devices 50. The output module 601 outputs the abnormal packets acquired from the respective collection devices 50.

While the output screen which is output by the output module 601 to a display or the like is as explained in the first embodiment, because the results of a plurality of collection devices are displayed, there may be a monitoring screen for each collection device, or identification information of the collection device may be added and displayed.

Because the flow of execution processing during the trial run of the log analyzing system according to this embodiment is the same as the flow of the sequence diagram shown in FIG. 5, the explanation thereof is omitted. Note that the mode management module 509 of the collection device 50 sets the operation mode to the default mode in substitute for the mode management module 310 of the monitoring device 30.

Figure 16:
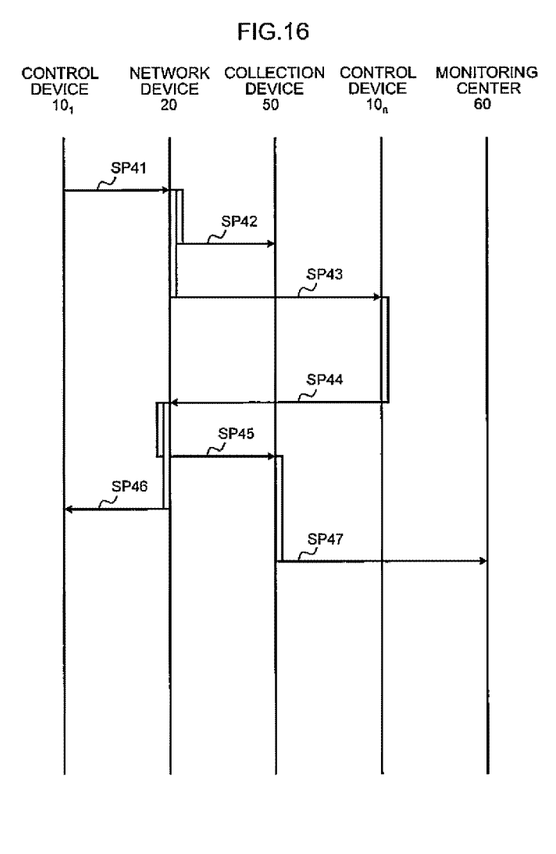
FIG. 16 is a sequence diagram showing a flow of the execution processing that is performed during the operation of the log analyzing system according to the second embodiment.

Because the flow of execution processing during the operation of the log analyzing system according to the second embodiment is basically the same as the flow of execution processing during the operation of the log analyzing system according to the second embodiment, only the differences are now explained with reference to FIG. 16.

Step SP41 to step SP46 are the same as step SP11 to step SP16 when the monitoring device 30 is replaced by the collection device 50. The external communication module 506 of the collection device 50 sends, to the monitoring center 60, the abnormal packet which was restored by the abnormal packet restoration module 505 (SP47).

In this embodiment, because the processing is divided between the collection device 50 and the monitoring center 60, it is possible to distribute the processing load and realize high-speed processing.

(3) Third Embodiment

Figure 17:
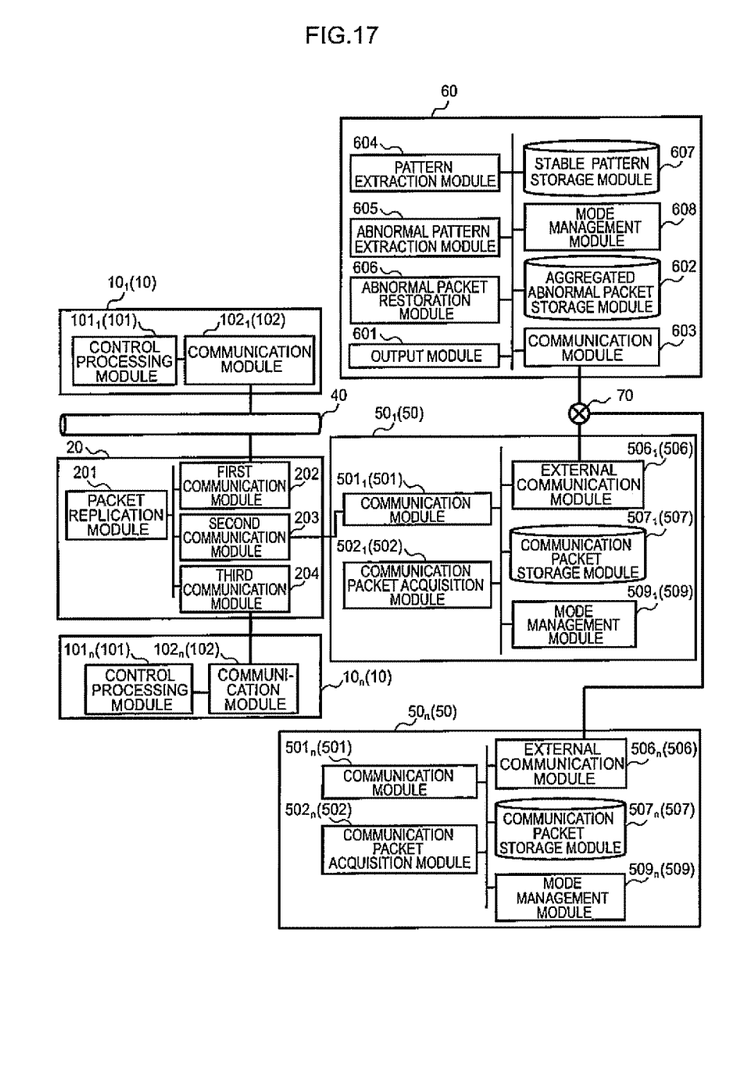
FIG. 17 is a block diagram showing a functional configuration of the log analyzing system according to the third embodiment.

In the second embodiment, while the abnormal packet was sent from the collection device 50 to the monitoring center 60, in this embodiment, as shown in FIG. 17, the collection device 50 sends the communication packet 1200 to the monitoring center 60, and the extraction of the abnormal pattern and the restoration of the abnormal packet are performed in the monitoring center 60.

Because the control device 10, the network device 20 and the network 40 are the same as the first embodiment, the explanation thereof is omitted. Because the hardware configuration of the collection device 50 and the monitoring center 60 is the same as the hardware configuration of the second embodiment, the explanation thereof is omitted.

The collection device 50 is provided in a plurality as collection devices $50_1$ to $50_n$, is a device such as a layer 2 switch or a server which collects the communication packets 1200, and comprises a communication module 501, a communication packet acquisition module 502, an external communication module 506, a communication packet storage module 507, and a mode management module 509.

Because the communication module 501, the communication packet acquisition module 502, the external communication module 506, the communication packet storage module 507 and the mode management module 509 are equivalent to the second embodiment, the explanation thereof is omitted.

The monitoring center 60 is a device such as a layer 2 switch or a server which monitors the log analyzing system, and comprises an output module 601, an aggregated abnormal packet storage module 602, a communication module 603, a pattern extraction module 604, an abnormal pattern extraction module 605, an abnormal packet restoration module 606, and a stable pattern storage module 607.

During the trial run of the log analyzing system, the pattern extraction module 604 acquires the communication packet 1200 from the collection device 50 via the communication module 603 and the external network 70. During operation, the abnormal pattern extraction module 605 acquires the communication packet 1200 from the collection device 50 via the communication module 603 and the external network 70.

The output screen which is output by the output module 601 to a display or the like is as explained in the second embodiment.

Figure 18:
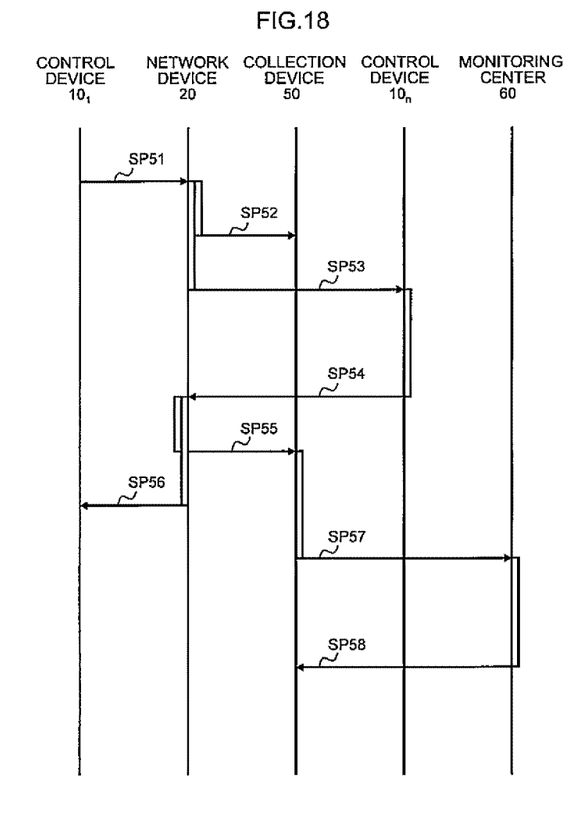
FIG. 18 is a sequence diagram showing a flow of the execution processing that is performed during the trial run of the log analyzing system according to the third embodiment.

Because the flow of execution processing during the trial run of the log analyzing system according to this embodiment is basically the same as the flow of the sequence diagram shown in FIG. 16, only the differences are now explained with reference to FIG. 18.

Foremost, the mode management module 509 of the collection device 50 sets the operation mode of the collection device 50 to the default mode. Here, when the operation mode cannot be set to the default mode or the subsequent processing will be executed without the operation mode being set to the default mode, the subsequent processing may be cancelled.

Subsequently, the mode management module 608 of the monitoring center 60 sets the operation mode of the monitoring center 60 to the default mode. Here, when the operation mode cannot be set to the default mode or the subsequent processing will be executed without the operation mode being set to the default mode, the subsequent processing may be cancelled.

Step SP51 to step SP57 are the same as step SP41 to step SP47. The communication packet 1200 is sent from the external communication module 506 of the collection device 50 to the communication module 603 of the monitoring center 60 (SP57).

When the communication module 603 of the monitoring center 60 receives the communication packet 1200, the monitoring center performs the respective processing, the mode management module 608 thereafter sets the operation mode of the monitoring center 60 to the active mode, and the communication module 603 of the monitoring center 60 returns a reply to the external communication module 506 of the collection device 50 (SP58).

When the external communication module 506 of the collection device 50 receives the reply, the mode management module 509 sets the operation mode of the collection device 50 to the active mode.

Because the flow of execution processing during the operation of the log analyzing system according to this embodiment is the same as the flow of execution processing during the operation of the log analyzing system according to the second embodiment, the explanation thereof is omitted.

In this embodiment, because the processing is divided between the collection device 50 and the monitoring center 60, it is possible to distribute the processing load and realize high-speed processing.

(4) Other Embodiments

Note that while the first, second and third embodiments described above explained cases where the monitoring device 30, the collection device 50 and the network device 20 are separate devices, the present invention is not limited thereto, and, for example, the function of the network device 20 may be included in the monitoring device 30 or the collection device 50, and the control device 10, the monitoring device 30 and the collection device 50 may not be equipped with a communication function for communicating with the network 40, and communication with the network 40 may be performed through a separate device.

Moreover, while the first, second and third embodiments described above explained cases where the network 40 and the external network 70 were not filtered, the present invention is not limited thereto, and the network 40 and the external network 70 may be filtered.

REFERENCE SIGNS LIST

10: control device, 11: communication device, 12: I/O device, 13: storage device, 14: CPU, 15: memory, 16: internal communication line, 101: control processing module, 102: communication module, 20: network device, 21: communication device, 21$_1$: first communication device, 21$_2$: second communication device, 21$_3$: third communication device, 22: storage device, 23: I/O device, 24: CPU, 25: memory, 26: internal communication line, 201: packet replication module, 202: first communication module, 203: second communication module, 204: third communication module, 30: monitoring device, 31: communication device, 32: I/O device, 33: storage device, 34: CPU, 35: memory, 36: reading device, 37: storage medium, 38: internal communication line, 301: communication module, 302: communication packet acquisition module, 303: pattern extraction module, 304: abnormal pattern extraction module, 305: abnormal packet restoration module, 306: output module, 307: communication packet storage module, 308: stable pattern storage module, 309: abnormal packet storage module, 310: mode management module, 50: collection device, 501: communication module, 502: communication packet acquisition module, 503: pattern extraction module, 504: abnormal pattern extraction module, 505: abnormal packet restoration module, 506: external communication module, 507: communication packet storage module, 508: stable pattern storage module, 509: mode management module, 60: monitoring center, 601: output module, 602: aggregated abnormal packet storage module, 603: communication module, 604: pattern extraction module, 605: abnormal pattern extraction module, 606: abnormal packet restoration module, 607: stable pattern storage module, 608: mode management module, 70: external network.

The invention claimed is:

1. A log analyzing system which analyzes a log of communications of a control device, the log analyzing system comprising:
   a network device which receives a plurality of communication packets corresponding to the communications of the control device from a network; and
   a monitoring device which monitors the plurality of communication packets to the network device including reception times and reception sizes of the plurality of communication packets,
   wherein the monitoring device is programmed to:
   create time series data indicating respective reception times and receptions sizes of the plurality of communication packets,
   frequency convert the time series data to generate information of respective frequencies and strength of the plurality of communication packets based on the respective reception times and receptions sizes of the plurality of communication packets,
   extract an abnormal pattern by determining a difference between the frequency-converted time series data and a predetermined stable pattern representing communication in a state of no unauthorized access, and
   inverse frequency convert the extracted abnormal pattern to acquire one or more respective times and sizes of one or more abnormal communication packets among the plurality of communication packets, and
   output the one or more abnormal communication packets including the respective times and sizes thereof.

2. The log analyzing system according to claim 1, wherein the network device is programmed to replicate the plurality of communication packets and sends the plurality of replicated communication packets to the monitoring device.

3. The log analyzing system according to claim 1, wherein the monitoring device receives the plurality of communication packets based on communications collected by a collection device connected to the network device.

4. The log analyzing system according to claim 1, wherein the monitoring device is programmed to:
   output a display screen which includes the plurality of communication packets in time series, and the one or more abnormal communication packets in an identifiable manner with the communication packets of the stable pattern in time series.

5. The log analyzing system according to claim 1, wherein the monitoring device is programmed to:
   acquire the stable pattern according to an operational status which is a trial condition of the control device.

6. A log analyzing method in a log analyzing system which analyzes a log of communications of a control device, wherein the log analyzing system includes:
   a network device which receives a plurality of communication packets corresponding to the communications of the control device from a network; and
   a monitoring device which monitors the plurality of communication to the network device,
   the log analyzing method comprising:
   creating time series data indicating respective reception times and receptions sizes of the plurality of communication packets,
   frequency converting the time series data to generate information of respective frequencies and strength of the plurality of communication packets based on the respective reception times and receptions sizes of the plurality of communication packets,
   extracting an abnormal pattern by determining a difference between the frequency-converted time series data and a predetermined stable pattern representing communication in a state of no unauthorized access, and
   inverse frequency converting the extracted abnormal pattern to acquire one or more respective times and sizes of one or more abnormal communication packets among the plurality of communication packets, and
   outputting the one or more abnormal communication packets including the respective times and sizes thereof.

* * * * *